Jan. 24, 1967 W. KRITZLER 3,299,931
CAMERA CASE
Filed May 10, 1965 2 Sheets-Sheet 1
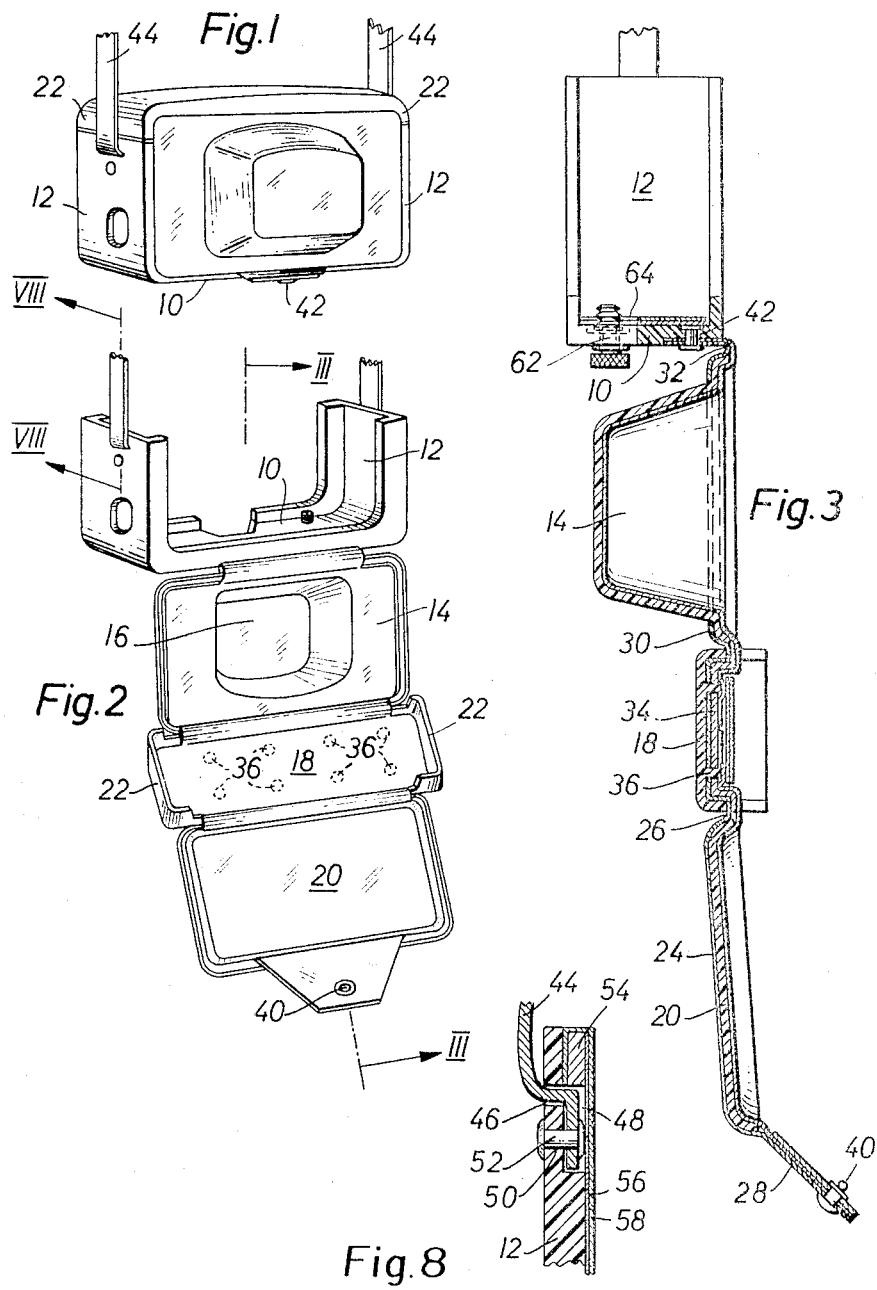
INVENTOR
WOLFGANG KRITZLER
BY
Raymond Wheeler
ATTORNEY Jan. 24, 1967          W. KRITZLER          3,299,931
                         CAMERA CASE
Filed May 10, 1965                              2 Sheets-Sheet 2
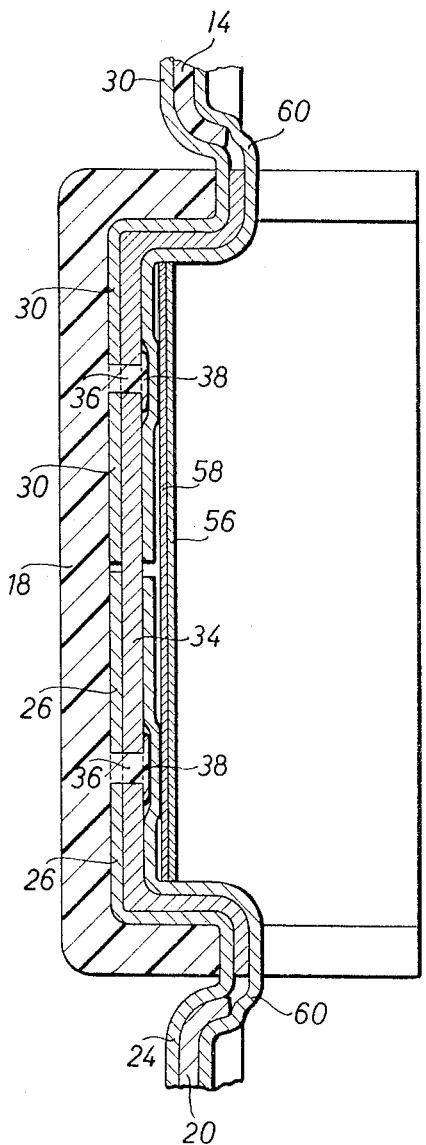
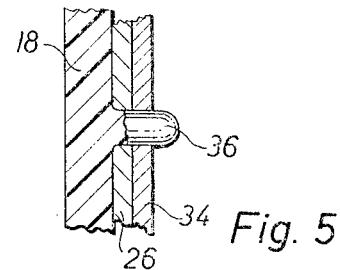
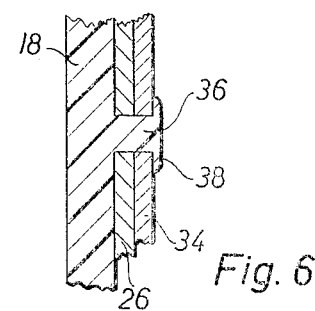
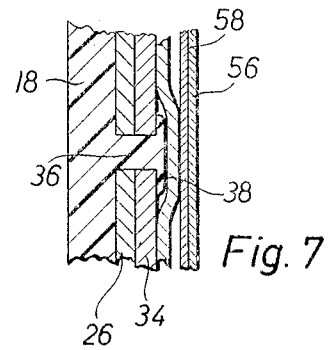
INVENTOR
WOLFGANG KRITZLER
BY
Raymond Wootton
ATTORNEY & # United States Patent Office 3,299,931
Patented Jan. 24, 1967

3,299,931
CAMERA CASE
Wolfgang Kritzler, Kolnerstrasse 146,
Derschlag, Germany
Filed May 10, 1965, Ser. No. 454,269
Claims priority, application Germany, May 15, 1964,
L 37,149
11 Claims. (Cl. 150—52)

The invention relates to a carrying case for cameras. Many forms of such cases are known, one of which comprises a base having end walls formed thereon, a front member hingedly connected to the base, a back member the lower end of which is releasably connected to the base, and a cover hinged to lie between the front member and the back member.

It is common for the cover of such a case to extend downwardly to an appreciable depth in order to protectively enclose the top of the camera. Because of the tendency to mount auxiliary equipment such as an exposure meter, a clip-on viewfinder, a shutter release and a cocking lever on the top surfaces of modern cameras, before an exposure can be taken, such equipment must be uncovered for access. In such cases, mere hinging of the cover to the front member of the case will not suffice for this purpose, particularly where the downwardly extending margins of the cover are so deep that the cover can no longer be lifted over the high superstructure of the camera.

To avoid this disadvantage, carrying cases have been developed in which a hinge is provided in the cover itself, and while such subdividing of the cover facilitiates removal of the cover from the superstructure of the camera such cases have involved a number of disadvantages. One of these disadvantages results from the small angle of opening of the hinge connecting the front member to the cover. Since the front member, which has to be folded away before an exposure can be taken, remains connected at such an undesirable angle that the cover, or the fastening strap that is connected to the inside thereof, assumes a position in front of the objective so as to spoil the exposure or prevent it from being taken. Another disadvantage of these known constructions arises from the fact that the hinges at the top of the cover or extending along the front edge of the cover, render it extremely difficult to render the case rainproof and dustproof. Finally, in such known constructions, the hinges are usually so heavy, because of the weight and size of the parts of the case that are attached thereto, that the aesthetic appearance of the case suffers and the cost of the hinges is excessive.

These disadvantages are avoided by the case contemplated by the present invention, wherein the top cover is in the form of a flat or slightly curved plate covering only the top of the camera, the front and back edges of the plate being hingedly connected to the front and back members and the narrow ends of the plate being flanged downwardly at an angle of 90°, so that in the closed condition of the case, it engages the upper edges of the end walls of the base member. In this way, the front and back members cover the ends of the camera along its entire height and the case consists of parts which can be readily swung away from one another to expose the camera at all sides.

For the purpose of connecting the individual parts of the case, the invention makes provision for hinges which connect the cover to the front and back members and which lie in substantially the same plane as such members. The hinges are in the form of straps which are made integrally with the front and back members, respectively, and extend therefrom to positions beneath the cover where they are attached.

A suitable material for the base, side walls and cover of the case according to the invention is a rigid substance such as plastic material and preferably a thermoplastic material.

One embodiment of a ready-for-use carrying case according to this invention is illustrated by way of example in the drawing, wherein:

FIG. 1 is a perspective view of the case when closed;
FIG. 2 is a perspective view of the case when opened;
FIG. 3 is a section on the line 3—3 in FIG. 2;
FIG. 4 is an enlarged section through the cover 18 showing attachment of the straps to the cover;
FIGS. 5–7 illustrate different stages during the upsetting of pins which extend from the cover for attaching the straps thereto; and
FIG. 8 is an enlarged section through those parts of the side walls where the carrying strap is connected, taken on the line 8—8 in FIG. 2.

FIG. 2 illustrates the base 10 with the two side walls 12 formed thereon. At the front edge of the base there is hinged the front member 14 which is bulged at 16 to receive the objective. The cover 18 is connected to the top of the front member 14. The back member 20 is attached to the rear edge of the cover 18.

FIGS. 1 and 2 show how the cover 18 is bent downwardly to form short flanges 22 which are intended to lie on the upper edges of the side walls 12.

FIG. 3 shows details of the interconnection of the individual parts of the case. The back member 20 is laminated with a flexible leather or artificial leather layer 24. This layer 24 extends beyond the end of the back member 20 and forms straps 26 and 28. The strap 26 extends to a position beneath the cover 18. Another strap 30, composed of flexible material, extends from the front member 14 and is laminated to the outer surface of the front member 14. This lamination is not completely shown in FIG. 3 because only the flat faces of the front member 14 are laminated and not the bulge 16 through which the section of FIG. 3 is taken. At the lower edge of the front member 14, the lamination is extended to form the strap 32 which serves as a connection to the base 10.

The two straps 26 and 30 enter the cover 18 from opposite sides. Within the cover, a profiled sheet metal plate 34 engages these straps and presses them tightly against the edges of the cover 18 to avoid any gap which would be unattractive or which would permit the entry of moisture or dust. The plate 34 is connected to the cover 18 by means of several integral pins 36 which extend from the inside of the cover 18. In the illustrated example these pins are arranged in two rows each row of which may comprise, for example, four pins 36 one behind the other, and these rows lie perpendicular to the plane of the drawing. Holes are provided in the straps 26 and 30 and in the profiled sheet metal plate 34 and these holes are placed over the pins 36 so that the latter project therethrough. This stage is illustrated in FIG. 5 for one of the pins 36. The pins 36 integrally connected to the cover 18 consist of a thermoplastic material so as to be deformable under heat. To press the plate 34 against the cover 18 the projecting ends of the pins 36 are therefore plasticised and upset by means of a hot tool to produce a form shown in FIG. 6 whereby the heads 38 are formed. These heads press the plate 34 tightly against the cover 18 and at the same time clamp the straps 26 and 30, and maintain the front member 14 against the back member 20.

The strap 28 also carries a snap fastener element 40 which is engaged with a complementary snap fastener element 42 on the base 10 (FIG. 1) serving to secure the case in its closed condition.

FIG. 3 shows the camera case in its open condition, i.e. the position assumed when an exposure is to be made. It will be evident that in this position only the base and side portions of the cover are covered by parts of the case. The front, back and top of the camera are completely exposed.

FIG. 3 also shows that the hinges formed by the straps 26, 30 and 32 do not project outwardly but instead, project inwardly of parts of the case. The hinge defined by the strap 26 is substantially covered by the back member 20 and the cover 18; the hinge defined by the strap 30 is substantially covered by the cover 18 and the front member 14; and the hinge defined by the strap 32 is substantially obscured by the front member 14 and the base 10.

FIGS. 1 and 2 show that the two ends of the carrying strap 44 are inserted into the side wall 12 from the outside. FIG. 8 illustrates in detail how the end of the carrying strap is connected to the side wall 12. The end of the carrying strap 44 is inserted through a slot 46. Beneath this slot 46 the side wall 12 is reduced to define a recess 48 in which the end of the carrying strap is received. Beneath the slot a hole 50 is provided accommodating a rivet 52 which secures the end of the carrying strap.

Further, FIG. 8 shows how the inside of the side wall 12 is covered. The free space towards the top of the recess 48 is filled with a piece of cardboard 54. A layer 56 of velvet lies thereabove and, in turn, rests on paper or thin cardboard 58. The inside of the cover 18 is furnished with the same materials 56 and 58. This is shown in FIG. 4 which also shows strips 60 made of velvet or like material. They constitute the covering for the front member 14 and back member 20. Their ends extend into the cover 18 and are covered by the materials 56 and 58.

FIG. 3 also shows the snap fastener element 42 into which the cooperating element 40 is inserted. The element 42 assumes the form of a hollow rivet in order to serve the added function of securing the strap 32 extending from the front member 14. A fastening screw 62 is provided at the base 10, positioned by a split ring 64, serving to secure the case to a tripod or the like.

I claim:
1. A camera case comprising a base member having front and back edges and upwardly extending end walls, a front member connected to said front edge by a hinge, a back member releasably connected to said base member, a top cover member having opposite sides connected to said front and back members respectively by strap hinges and having opposite ends terminating in narrow downwardly directed flanges engaging said end walls under closed conditions of said case.

2. A camera case according to claim 1 wherein said strap hinges are attached to an interior surface of said top cover member.

3. A camera case according to claim 1 wherein said strap hinges are integral with said front and back members respectively.

4. A camera case according to claim 1 wherein said front and back members are laminated and said strap hinges are integral with laminations of said front and back members respectively.

5. A camera case according to claim 1 wherein said base member is composed of a rigid plastic material.

6. A camera case according to claim 1 wherein said top cover member includes opposed plates having said strap hinges clamped therebetween.

7. A camera case according to claim 1 wherein said top cover member includes a thermoplastic plate and an opposed metal plate having said strap hinges interposed therebetween, and rivets integral with said thermoplastic plate securing said metal plate and strap hinges thereto.

8. A camera case according to claim 1 wherein said hinge connecting said front member to said front edge is a strap attached to said base by a hollow rivet.

9. A camera case according to claim 1 wherein said end walls contain slots adjacent their upper edges, and a carrying strap has opposite ends projecting into said slots and riveted to said end walls below said slots.

10. A camera case according to claim 9 wherein said end walls are reduced in thickness adjacent said slots to receive the ends of said strap.

11. A camera case according to claim 1 wherein said members have internal surfaces lined with a soft textile material.

References Cited by the Examiner
UNITED STATES PATENTS
2,136,357  11/1938  Darling et al. _____ 95—31
FOREIGN PATENTS
963,670  1/1950  France.

FRANKLIN T. GARRETT, *Primary Examiner.*